United States Patent
Hill et al.

(10) Patent No.: US 8,190,785 B2
(45) Date of Patent: May 29, 2012

(54) PLUG-AND-PLAY DEVICE AND METHOD FOR ENHANCING FEATURES AND SETTINGS IN AN INTERACTIVE DISPLAY SYSTEM

(75) Inventors: Doug Hill, Calgary (CA); Keith Wilde, Calgary (CA)

(73) Assignee: SMART Technologies ULC, Calgary, Alberta (CA)

( * ) Notice: Subject to any disclaimer, the term of this patent is extended or adjusted under 35 U.S.C. 154(b) by 717 days.

(21) Appl. No.: 11/420,600

(22) Filed: May 26, 2006

(65) Prior Publication Data

US 2008/0005371 A1    Jan. 3, 2008

(51) Int. Cl.
*G06F 3/00* (2006.01)
*G06F 13/00* (2006.01)
*G06F 9/00* (2006.01)
*G06F 9/24* (2006.01)
*G06F 15/177* (2006.01)
*G06F 1/24* (2006.01)

(52) U.S. Cl. .................... 710/8; 710/104; 713/1; 713/2; 713/100

(58) Field of Classification Search .............. 710/8, 104; 713/1, 2, 100
See application file for complete search history.

(56) References Cited

U.S. PATENT DOCUMENTS

| | | | |
|---|---|---|---|
| 6,085,265 A * | 7/2000 | Kou ................................. | 710/63 |
| 6,248,083 B1 * | 6/2001 | Smith et al. .................... | 600/585 |
| 6,529,992 B1 | 3/2003 | Thomas et al. | |
| 6,704,824 B1 | 3/2004 | Goodman | |
| 6,803,906 B1 | 10/2004 | Morrison et al. | |
| 6,898,653 B2 | 5/2005 | Su et al. | |
| 2002/0118180 A1 | 8/2002 | Martin | |
| 2003/0225971 A1 | 12/2003 | Oishi et al. | |
| 2004/0127254 A1 | 7/2004 | Chang | |
| 2004/0183787 A1 * | 9/2004 | Geaghan et al. .............. | 345/173 |
| 2004/0201575 A1 * | 10/2004 | Morrison ...................... | 345/173 |
| 2004/0205778 A1 | 10/2004 | Wong et al. | |
| 2004/0230708 A1 * | 11/2004 | Juan .................................. | 710/1 |
| 2005/0038934 A1 | 2/2005 | Gotze et al. | |
| 2005/0157298 A1 * | 7/2005 | Evanicky et al. ............. | 356/416 |
| 2005/0223145 A1 * | 10/2005 | Lin et al. ......................... | 710/62 |
| 2005/0278461 A1 | 12/2005 | Ohta | |
| 2006/0015676 A1 | 1/2006 | Oribe et al. | |
| 2006/0081716 A1 * | 4/2006 | Andrus ........................ | 235/492 |
| 2006/0173980 A1 | 8/2006 | Kobayashi et al. | |

(Continued)

FOREIGN PATENT DOCUMENTS

EP    1 566 726 A1    8/2005

(Continued)

OTHER PUBLICATIONS

Michael S. Lasky, "U3: Portable Programs on a USB Drive," Oct. 31, 2005.*

(Continued)

*Primary Examiner* — Chun-Kuan Lee
*Assistant Examiner* — Farley Abad
(74) *Attorney, Agent, or Firm* — Katten Muchin Rosenman LLP

(57) ABSTRACT

A plug-and-play device providing a set of functionality comprises a plug-and-play interface, storage, and software stored in the storage. The software is automatically executed by a computer when the plug-and-play device is connected thereto via the plug-and-play interface. The software detects disconnection of the plug-and-play device from the computer and terminates execution in response thereto. The computer does not persistently store the software thereafter.

67 Claims, 3 Drawing Sheets

U.S. PATENT DOCUMENTS

| | | |
|---|---|---|
| 2006/0195840 A1 | 8/2006 | Sundarrajan |
| 2007/0165007 A1 | 7/2007 | Morrison et al. |
| 2009/0069049 A1 | 3/2009 | Jain |
| 2009/0077271 A1* | 3/2009 | Kaag ............................ 710/10 |

FOREIGN PATENT DOCUMENTS

| | | |
|---|---|---|
| WO | 2004/040428 A1 | 5/2004 |

OTHER PUBLICATIONS

"U3" Wikipedia, Dec. 15, 2005, http://web.archive.org/web/20051215000000/http://en.wikipedia.org/wiki/U3 1/4/2010.*

International Search Report for International Application No. PCT/CA2007/000938 mailed Aug. 15, 2007.

Jerry Pournelle, "Beware of Sony's DRM", Dr. Dobb's Journal, Feb. 2006 at URL<http://www.ddj.com>.

Supplementary European Search Report for European Patent Application No. EP 07 71 9860.

Transmittal, International Search Report, and Written Opinion for International Patent Application No. PCT/CA2010/000185.

Mar. 12, 2010 Office Action for European Patent Application No. 07719860.4.

Sep. 14, 2010 Letter from Olivares & CIA. summarizing an Office Action for Mexican National Phase Patent Application No. MX/a/2008/015010.

May 25, 2010 Examination Report for New Zealand Patent Application No. 572701.

International Preliminary Report on Patentability for International Application No. PCT/CA/2007/000938.

Office Action for Russian Patent Application No. 2008151698/08(067918) with a mailing date of Jun. 15, 2011, and an English translation thereof.

* cited by examiner

PLUG-AND-PLAY DEVICE AND METHOD FOR ENHANCING FEATURES AND SETTINGS IN AN INTERACTIVE DISPLAY SYSTEM

FIELD OF THE INVENTION

The present invention relates generally to computer peripheral devices and, more specifically, to a plug-and-play device and a method of using the same.

BACKGROUND OF THE INVENTION

Plug-and-play devices are well known and many types of plug-and-play standards exist, including universal serial bus ("USB"), IEEE1394 ("FireWire") and PCMCIA ("PC Card"), with the most common being USB. Such devices have a set of functionality that is accessible to a computer through a plug-and-play interface. This functionality can include, but is not limited to, storage, input registration, image capturing, audio input and output, etc. Many sets of functionality are pre-defined as device classes. Upon connection of a plug-and-play device to a computer, an electronic circuit is completed and the operating system of the computer is alerted of the connection. The operating system polls the plug-and-play device to determine what functionality is available on the device.

Many operating systems possess a number of pre-loaded drivers for generic plug-and-play device classes, such as USB mass storage, a two-button mouse, etc. If the operating system is in possession of a driver for the device class of the plug-and-play device connected to the computer, the driver is loaded so that the functionality of the device can be accessed. If, instead, the operating system does not possess a driver corresponding to the device class of the plug-and-play device, the operating system can prompt the user to install the appropriate software to enable the computer to access the functionality of the device.

For example, U.S. Patent Application Publication No. 2004/0205778 to Wong et al. discloses a peripheral device that includes driver storage. The peripheral device connects to a computer via a plug-and-play interface and cycles through the emulation of a number of plug-and-play device classes recognized by the operating system until one is found that permits auto-execution of a driver installation program.

U.S. Patent Application Publication No. 2005/0038934 to Gotze et al. discloses a USB-based peripheral printer that can be conditioned between two modes. In a first mode, the printer emulates USB mass storage to permit installation of drivers stored in memory of the printer onto a computer to which the printer is connected. Once the drivers are installed, the printer is conditioned into a second mode, in which it behaves as a printer. The drivers installed on the computer enable printing on the printer.

The need to install software/drivers can be undesirable in a number of situations, such as where a user does not possess administrative rights for the computer or simply does not desire to install yet more software on the computer, especially where the connection of the plug-and-play device is infrequent or a one-time affair. Installing software may also prove to be a difficult or complicated task. For example, the user may need to download software from the Internet or may need to locate media upon which the software/drivers are located.

Where the plug-and-play device is a touch panel, calibration to map the coordinate system of the input field of the touch panel to the computer display coordinate system is typically required in order to ensure proper registration of touch input. Calibration is the process of checking or adjusting the accuracy of a device, such as the interpretation of input or the presentation of output.

Generally, a calibration process needs to be carried out so that calibration settings can be registered by the computer. These calibration settings are stored on the computer that performed the calibration. As a result, however, when the touch panel is plugged into a computer to which it was not previously connected, the calibration process must be carried out again in order to establish the calibration settings on the new computer.

SUMMARY OF THE INVENTION

Accordingly, in one aspect there is provided a plug-and-play device providing a set of functionality, comprising:
a plug-and-play interface;
storage; and
software stored in said storage, said software being automatically executed by a computer when said plug-and-play device is connected thereto via said plug-and-play interface, said software being operable to detect disconnection of said plug-and-play device from said computer and terminate execution in response thereto, said computer not persistently storing said software thereafter.

In one implementation, the software enables the computer to access the set of functionality provided by the plug-and-play device. The plug-and-play interface can be a universal serial bus interface. The storage can store an autorun.inf file that specifies the software for execution. The software can be copied to a temporary location on the computer and executed therefrom, and can be terminated and deleted upon disconnection of the plug-and-play device from the computer.

According to another aspect, there is provided a method of using a plug-and-play device with a computer, comprising:
detecting connection of a plug-and-play device to said computer;
automatically locating software specified for execution, said software being stored in memory of said plug-and-play device;
executing said software with said computer; and
terminating execution of said software upon disconnection of said plug-and-play device from said computer.

According to yet another aspect, there is provided a plug-and-play device, comprising:
storage; and
settings stored in said storage, said settings being associated with a set of functionality.

The plug-and-play device can further include software stored in the storage, the software providing access to the set of functionality when the plug-and-play device is connected to a computer. The set of functionality in this case is an input interface provided by the plug-and-play device.

Alternatively, the plug-and-play device can include software stored in the storage, the software being executable on a computer to which the plug-and-play device is connected and providing access to the set of functionality. The software can reference the calibration settings during execution. The software can be automatically executed by the computer when the plug-and-play device is connected thereto via a plug-and-play interface thereof, with the software detecting disconnection of the plug-and-play device from the computer and terminating execution in response thereto. In this case, the computer does not persistently store the software thereafter. The plug-and-play device can also include calibration software for setting the calibration settings for the set of functionality.

According to still yet another aspect, there is provided a plug-and-play device for receiving input, comprising:
    a plug-and-play interface;
    a touch panel on which a computer-generated image is displayed;
    storage; and
    calibration settings stored in said storage and mapping touch panel an computer-generated image coordinate systems.

According to still yet another aspect, there is provided a method of adjusting the function of a computer, comprising:
    retrieving calibration settings from an external device associated with functionality provided by the external device; and
    adjusting the function of said computer using said calibration settings.

According to still yet another aspect, there is provided a plug-and-play device providing a set of functionality, comprising:
    a plug-and-play interface;
    storage; and
    software stored in said storage, said software being copied to said computer and executed therefrom automatically when said plug-and-play device is connected to said computer, said software providing access to said set of functionality of said plug-and-play device.

By storing software for the plug-and-play device on the plug-and-play device itself that automatically loads onto the computer when the plug-and-play device is connected to the computer, the user of the plug-and-play device need not pre-install software/drivers on the computer in order to access the functionality offered by the plug-and-play device nor does the user require administrative rights for the computer in order to use the software. As the software is not stored persistently on the computer upon termination, the computer is left in the same general state it was in before connection to the plug-and-play device. Further, by storing settings on the plug-and-play device, a setup process need not be performed when a new computer is connected to the plug-and-play device.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
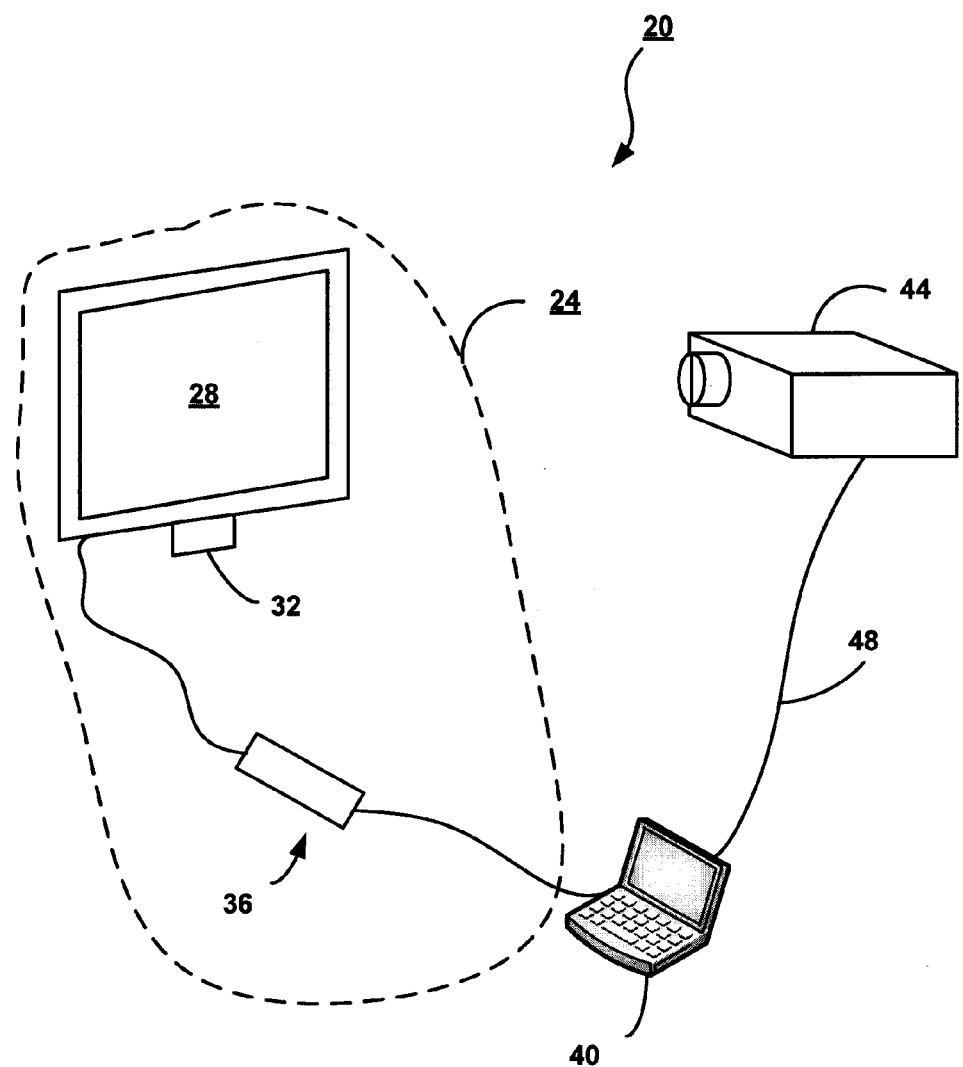
FIG. 1 shows a plug-and-play device comprising a touch panel, a controller and a cable, coupled to a computer.

FIG. 1 illustrates a system 20 comprising a plug-and-play device 24 for receiving and digitizing input. In this embodiment, the plug-and-play device 24 includes a touch panel 28, a controller 32 and a cable 36. Touch panel 28 is of the type manufactured and sold by SMART Technologies, Inc. of Calgary, Alberta under the name SMARTBoard™. The controller 32 controls the operation of the touch panel 28 and is in communication with a computer 40 via the cable 36. An LCD projector 44 is coupled to the computer 40 via a VGA cable 48. The computer 40 controls the LCD projector 44 to project images otherwise presented on a display of the computer 40 onto the touch panel 28. The projector 33 may be positioned in front of or behind the touch panel 28.

The touch panel 28 provides a user with the ability to interact with the projected images via a pointer, such as a marker or a finger, for the purpose of providing input. The touch panel requires no extra software other than that provided by the operating system to work as a mouse. The functionality of the touch panel is greatly enhanced by additional software not available on the operating system, as will be described below.

The controller 32 includes a processor (not shown) that executes firmware stored in non-volatile storage. Generally, the firmware causes the controller 32 to operate in one of two operational modes. In an initial mode, the controller 32 operates two USB profiles, namely an absolute mouse human interface device ("HID") profile and a touch panel HID profile. The absolute mouse HID profile enables the controller 32 to relay absolute position information for a pointer, as it is detected by the touch panel 28, along with basic mouse functions. The touch panel HID is a device class that enables enhanced functionality for the touch panel 28. The enhanced functionality includes all of the functionality available in the absolute mouse HID device class, plus inking information, additional tool information (buttons, eraser, pen selection, etc.) and two-way communications with the controller 32. In a "native" operating mode, the controller 32 terminates the absolute mouse HID profile and only operates the touch panel HID profile.

Figure 2:
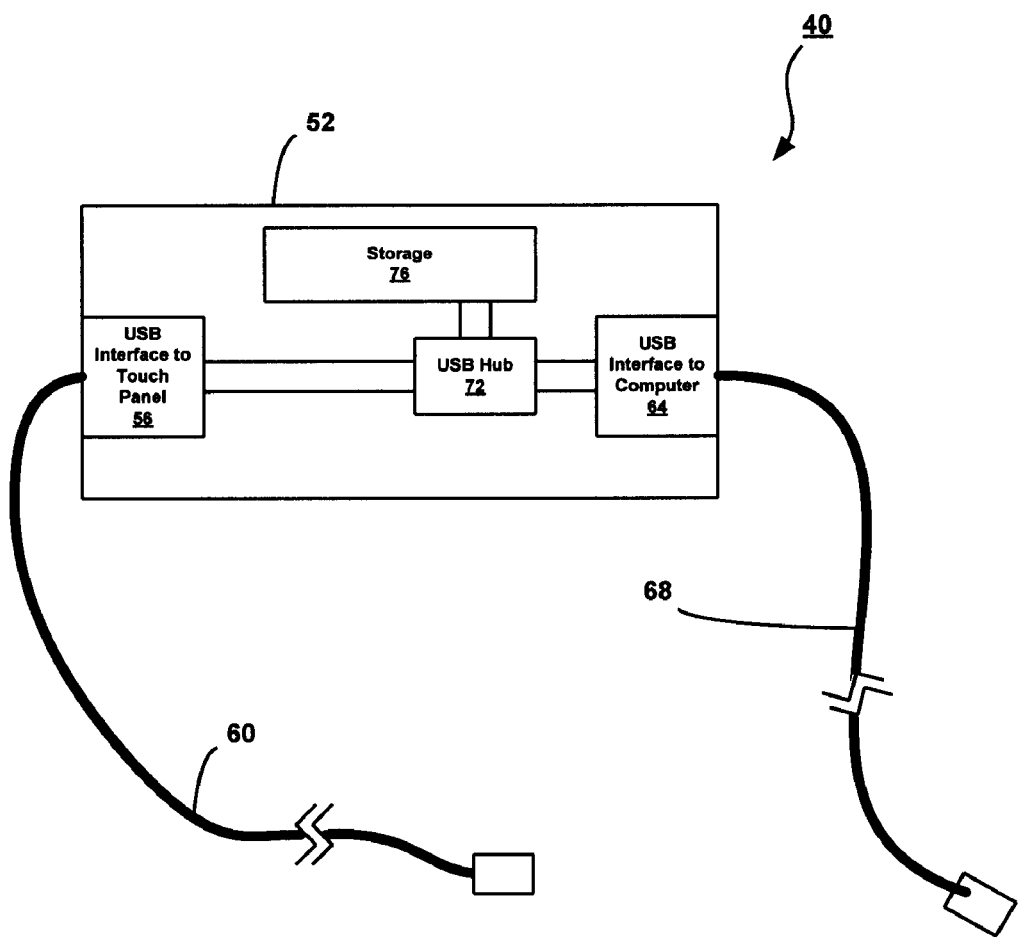
FIG. 2 shows a schematic diagram of the cable of FIG. 1.

The components of the cable 36 are described with reference to FIG. 2. The cable 36 includes a USB hub component 52 that has a first USB interface 56 for connection to a USB cable 60 that extends to the touch panel 28, and a second USB interface 64 for connection to a USB cable 68 that extends to the computer 40. Both the first and second USB interfaces 56, 64 are in communication with a USB hub 72.

Also in communication with the USB hub 72 is storage 76, namely flash memory, that is configured to operate in accordance with the compact disk ("CD") HID profile. The CD HID profile enables storage 76 to behave like a CD drive. Storage 76 stores a set of software applications, including a user application, a service application, a launcher application, a calibration application and an autorun.inf file that references the launcher application. Further, the storage 76 can also store calibration settings associated with the configuration of the system 20. In particular, the calibration settings include data for mapping input received by the touch panel 28 with output projected by the LCD projector 44 onto the surface of the touch panel 28.

The position of the LCD projector 44 and the touch panel 28 are generally fixed relative to one another. As a result, once their relative positions are determined, they do not have to be re-determined.

The user application permits a richer set of features than basic mouse functionality. It contains a number of presentation applications, integration into popular drawing and presentation applications, and an application to allow users to ink over documents in any application or the desktop of the graphical user interface of the computer 40 that is projected onto and displayed on the surface of the touch panel 28.

Figure 3:
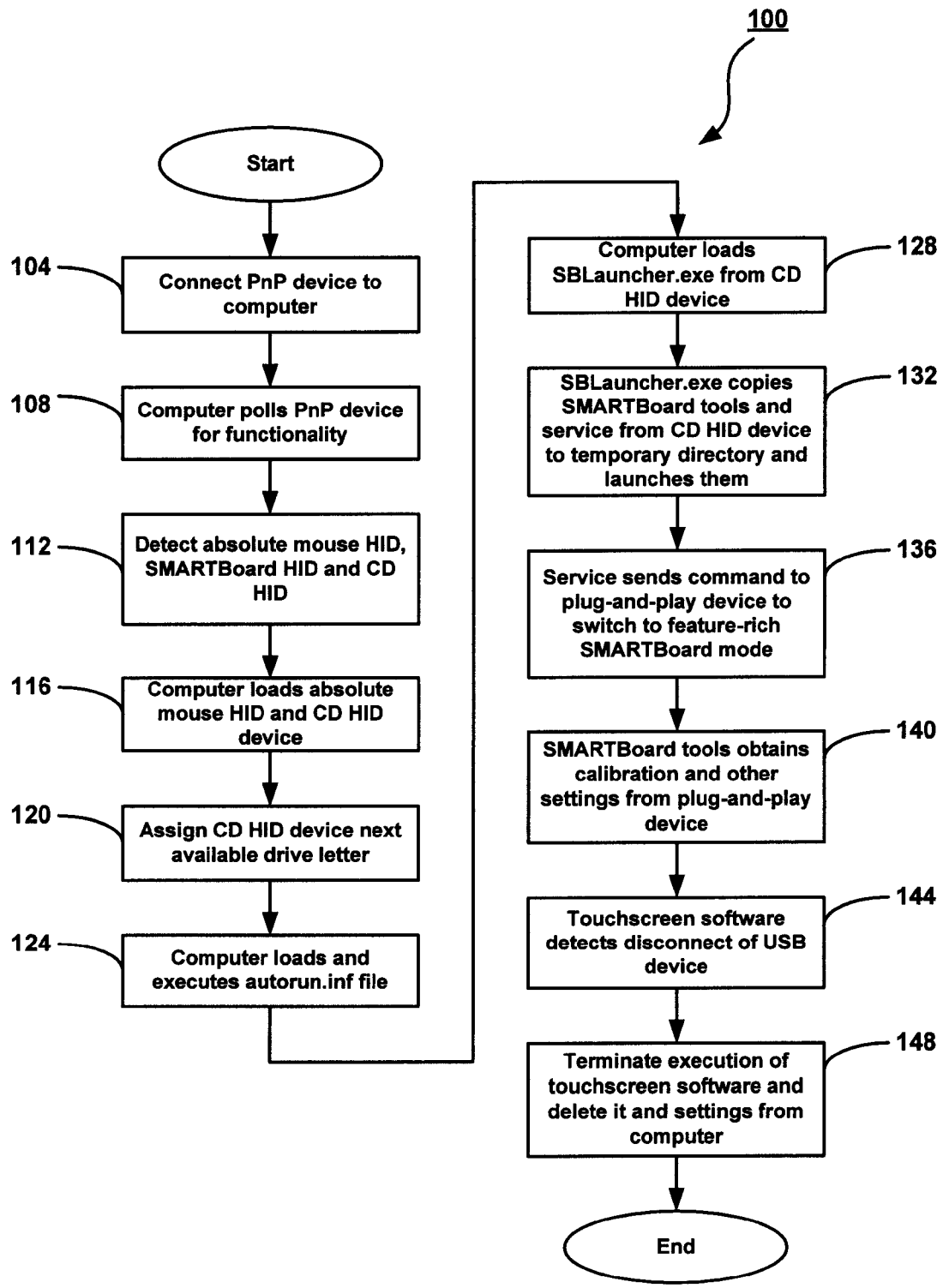
FIG. 3 is a flow chart of the general operation of the plug-and-play device of FIG. 1.

The method of operation of the plug-and-play device 24 is shown in FIG. 3. When the plug-and-play device 24 is connected to the computer 40 (step 104), and the connection of the plug-and-play device 24 to the computer 40 is detected by the operating system of the computer 40, the computer 40 queries the plug-and-play device 24 to determine what functionality is provided by the plug-and-play device 24 (step 108). As the USB hub 72 is connected to storage 76 as well as the controller 32, the USB hub 72 queries each of these two units to determine what profiles are available. The storage 76 responds by indicating that it supports the CD HID profile. The controller 32, which is in the initial mode, responds by indicating that it supports the absolute mouse HID profile and the touch panel HID profile.

The computer 40, upon receiving this information, detects that the following functionality is available for the plug-and-play device 24: the absolute mouse HID profile, the touch panel HID profile and CD HID profile (step 112). The computer 40 loads the drivers for the devices recognized by the operating system (i.e. for which the operating system has drivers); namely, the absolute mouse HID and CD HID (step 116). As each of these sets of functionality are detected by the computer 40, the computer 40 recognizes them as separate devices. The computer 40 does not load the touch panel HID profile as the operating system of the computer 40 does not possess a corresponding driver. The computer 40 then assigns the detected CD HID device the next available drive letter (step 120).

Computer 40 is configured as the majority of computers are by default; that is, it is configured to search CD HID devices for a file named autorun.inf that will direct the computer 40 to automatically execute a specific application upon connection to a CD HID device. Accordingly, computer 40 queries the CD HID device for autorun.inf and, upon receiving it, loads and executes the instructions contained therein (step 124). The autorun.inf file is used by the Microsoft Windows® family of operating systems to execute, under certain conditions, the instructions contained therein upon detection of certain types of storage devices. For example, under certain conditions, the autorun.inf file is executed when a CD-ROM disk, containing the autorun.inf file, is inserted into the bay of a CD-ROM drive. Execution typically begins without delay after the information in the autorun.inf file becomes available to or is recognized by the operating system.

The autorun.inf file contains a pointer to the executable launcher application. Upon parsing the autorun.inf file, the computer 40 uses the pointer to obtain the launcher application from the storage 76, along with a set of corresponding dynamic link libraries ("DLLs"), and executes it (step 128). The launcher application, in turn, directs the computer 40 to copy two executable files, namely the user application and the service application along with some associated DLLs, from the storage 76 to a temporary directory on the computer 40 and execute them (step 132). Upon execution of the service application, the launcher application terminates execution and the service application directs the computer 40 to send a command to the controller 32 to switch to the touch panel HID mode (step 136).

Upon launch, the user application queries and obtains from storage 76 of the plug-and-play device 24 the calibration settings and other settings (step 140). The calibration settings enable the user application to map touch input received from the touch panel 28 to the computer display coordinate system. The other settings include pen tray settings, COM port settings, contact filter settings and user settings for some of the software applications. All of these settings are stored in a standard Windows INI file. Further, several XML files are used to store layout and menu settings for various applets forming part of the user application. These applets provide a floating window of toolbuttons for accessing various functionality, an on-screen keyboard, etc. These layout and menu settings are stored in XML files in the storage 76 of the plug-and-play device 24, and are loaded and saved in the user directory "C:\Documents and Settings\<user name>\ApplicationData\SMART Technologies Inc.\SMARTBoard™ Software\" during execution of the user application, where <user name> is the login name of the current user.

Upon obtaining the calibration settings, the user application permits user interaction with the touch panel 28 to be registered spatially relative to the images projected on the surface of the touch panel 28 by the LCD projector 44. During execution, some settings are stored in the "HKEY_CURRENT_USER" key of the registry and, in particular, in the "Software\SMART Technologies Inc.\SMARTBoard™ Software\" subkey. These settings include application window positions, user settings for each application and a list of recently used files. The "HKEY_CURRENT_USER" key is used as there are generally no restrictions on modifications made to this key. In addition, if there are no access restrictions on the "HKEY_LOCAL_MACHINE" key, spell checker settings are written there.

Upon termination of the session, the computer 40 can be unplugged from the plug-and-play device 24 and removed. When the plug-and-play device 24 is disconnected, the computer 40 notifies the launcher application (step 144). The launcher application proceeds to terminate execution of and delete the user application, the service application, the various related DLLs and settings from the temporary locations on the computer 40 and then does the same for itself (step 148). Before termination of execution of the launcher application, it writes the user settings stored in "C:\Documents and Settings\<user name>\Application Data\SMART Technologies Inc.\SMARTBoard™ Software\" to XML files which it then stores in storage 76 of the plug-and-play device 24. The launcher application then deletes these settings and those stored in the registry. Once the settings and files are deleted from the computer 40, the launcher application places an entry in the HKEY_CURRENT_USER\Software\Microsoft\Windows\CurrentVersion \RunOnce registry key which tells Windows to delete the launcher application when the user logs in next, and then terminates execution. If, instead, the user stops the SMARTBoard™ software by closing the user application, then the launcher application executes the instance of itself found in the storage 76 of the plug-and-play device 24 and terminates execution of itself. In response, the launcher application is executed from the plug-and-play device 24 and deletes the instance of the launcher application stored on the computer 40.

As noted above, in order for input made relative to an image projected onto the touch panel 28 by the LCD projector 44 to be registered spatially with the image projected, the system 20 is calibrated. As the spatial relation between the image projected by the LCD projector 44 and the touch panel 28 changes only when the LCD projector 44 and the touch panel 28 are moved relative to one another, calibration is generally performed after the touch panel 28 and LCD projector 56 are fixed at a location. In order to calibrate the system 20, the calibrate application is launched. The user is then prompted to touch a number of points on the graphical user interface of the computer 40 that is displayed on the surface of the touch panel 28. The resulting touch panel output is used to map the raw touch coordinates registered by the touch panel 28 to the computer display coordinate system. The newly-captured calibration settings are then recorded in the Windows INI file so that they can be used by other computers to map input received from the plug-and-play device 24 with the graphical user interface presented thereon.

While the system has been described with specificity to USB, other types of plug-and-play architectures can be utilized. For example, those of skill in the art will readily understand how to adapt the system described herein for use with FireWire and PCMCIA architectures and the like.

The drivers for the plug-and-play device can be stored on a separate CD HID device or the like. Similarly, the calibration settings can be stored on a separate removable storage, such as a USB flash drive, rewritable optical disk, etc. In this manner, existing calibration settings can be made available to other computers that are coupled to the plug-and-play device. Alternatively, the calibration settings can be stored on the touch panel's controller using the two-way communication enabled by the touch panel HID profile.

While the system has been described with reference to a touch panel, the system can be any one of a number of other devices, such as cameras, sound systems, etc. For example, where the plug-and-play device is a sound system, the settings can include the output volumes for each speaker that have been previously calibrated to desired levels for the set configuration.

Although an embodiment has been described with reference to the accompanying drawings, those of skill in the art will appreciate that modifications and variations may be made without departing from the spirit and scope thereof as defined by the appended claims.

What is claimed is:

1. An interactive input system comprising:
   an interactive surface having a controller; and
   a plug-and-play cable connecting a computing device to the controller and establishing a bi-directional communication channel therebetween, wherein upon request of said computing device, said controller sending a plurality of human interface device profiles to said computing device via said plug-and-play cable, and upon receiving said plurality of human interface device profiles, said computing device loading a first human interface device profile, said plug-and-play cable comprising:
      storage;
      executable software stored on said storage, said software being automatically executed by the computing device when said plug-and-play cable is connected to the computing device, and when executed, said software instructing said computing device to send a command to said controller instructing said controller to switch from the first human interface device profile to a second human interface device profile; and
      settings stored on said storage, said settings being transferred to the computing device via said plug-and-play cable and being used by the computing device to calibrate automatically the computing device and the interactive surface, wherein said software enables said computing device and controller to communicate over said bi-directional communication channel and is operable to detect disconnection of said plug-and-play cable from said computing device and terminate execution in response thereto, said computing device not persistently storing said software and settings thereafter.

2. The interactive system of claim 1, wherein said plug-and-play cable comprises a universal serial bus interface.

3. The interactive system of claim 2, wherein said storage stores an autorun file that specifies said software for automatic execution.

4. The interactive system of claim 3, wherein said plug-and-play cable comprises a compact disk human interface device (CD HID) profile.

5. The interactive system of claim 2, wherein said software is copied to a temporary location on said computing device and executed therefrom, and wherein execution of said software is terminated and deleted from said temporary location upon disconnection of the plug-and-play cable from the computing device.

6. The interactive system of claim 2, wherein said software registers a request with the operating system of said computing device to delete said software at a later time.

7. The interactive system of claim 1, wherein said software is copied to a temporary location on said computing device and executed therefrom, and wherein execution of said software is terminated and deleted from said temporary location upon disconnection of the plug-and-play cable from the computing device.

8. The interactive system of claim 7, wherein said software executes an instance of said software stored in said storage of said plug-and-play cable, terminates its own execution and the instance of said software executing from said storage of said plug-and-play cable and deletes said software from said temporary location on said computing device.

9. The interactive system of claim 1, wherein said software registers a request with the operating system of said computing device to delete said software at a later time.

10. The interactive input system of claim 1, wherein said settings further comprise pen tray settings.

11. A method of interacting with an interactive surface comprising:
    connecting a plug-and-play cable between a computing device and a controller associated with the interactive surface;
    establishing a bi-directional communication channel between said computing device and said controller via the plug-and-play cable;
    in response to a request received by said controller from said computing device, sending a plurality of human interface device profiles from said controller to said computing device;
    upon receiving said plurality of human interface device profiles, loading a first human interface device profile on said computing device;
    automatically locating executable software stored on memory of said plug-and-play cable specified for execution and executing said located software on said computing device to cause said computing device to send a command to said controller instructing said controller to switch from the first human interface device profile to a second human interface device profile;
    automatically locating settings for said interactive surface and transferring the settings to said computing device;
    automatically calibrating said computing device and said interactive surface using said settings; and
    terminating execution of said software upon disconnection of said plug-and-play cable from said computing device, said computing device not persistently storing said software and settings thereafter.

12. The method of claim 11, wherein said executing comprises copying said software to storage on said computing device.

13. The method of claim 12, further comprising registering a request with the operating system of said computing device to delete said software at a later time.

14. The method of claim 11, wherein said settings further comprise pen tray settings.

15. A plug-and-play cable for interconnecting an interactive surface and a computing device and establishing a bi-directional communication channel therebetween, said plug-and-play cable comprising:
    storage; and
    a hub communicating with said storage, said hub providing executable software stored in said storage to said computing device for automatic execution upon connection of said plug-and-play cable to said computing device to enable the computing device and a controller of said interactive surface to communicate over said bi-directional communication channel and to cause the computing device to send a command to said controller instructing said controller to switch from a first human interface device profile to a second human interface device profile, said plug-and-play cable further communicating calibration settings to the computing device when the plug-and-play cable interconnects the interactive surface and computing device, wherein said settings are configured for use by the computing device to calibrate automatically said computing device and said interactive surface.

16. The plug-and-play cable of claim 15, wherein said software references said calibration settings during execution.

17. The plug-and-play cable of claim 16, wherein said software automatically detects disconnection of said plug-and-play cable from said computing device and terminates execution in response thereto, said computing device not persistently storing said software and settings thereafter.

18. The plug-and-play cable of claim 15, wherein the interactive surface comprises a touch panel on which images are projected, said calibration settings mapping touch panel and displayed image coordinate systems.

19. The plug-and-play cable of claim 15, wherein said software is copied to a temporary location on said computing device and executed therefrom, and wherein execution of said software is terminated and deleted from said temporary location upon disconnection of the plug-and-play cable from the computing device.

20. The plug-and-play cable of claim 15, wherein said software registers a request with the operating system of said computing device to delete said software at a later time.

21. The plug-and-play cable of claim 15, wherein said plug-and-play cable further communicates pen tray settings to said computing device.

22. An interactive system comprising:
a controller;
a plug-and-play cable comprising storage, said plug-and-play cable connecting the controller to a computing device and establishing a bi-directional communication channel therebetween, said storage storing executable program code that is transferred to said computing device upon connection of said plug-and-play cable to said computing device, upon execution of said program code, said computing device sending a command to said controller instructing said controller to switch from a first human interface device profile to a second human interface device profile;
an interactive display on which a computer-generated image from said computing device is displayed; and
calibration settings stored on said storage, said calibration settings being transferred to said computing device upon execution of software stored in said storage and being used by said computing device to automatically map a display of said computing device to said interactive display upon connection of said plug-and-play cable to the controller and computing device.

23. The interactive system of claim 22, wherein said computer-generated image comprises a graphical user interface.

24. The interactive system of claim 22, wherein said plug-and-play cable comprises a universal serial bus interface.

25. The interactive system of claim 22, further comprising calibration software stored on said storage for execution by the computing device to set said calibration settings.

26. The interactive system of claim 25, wherein said software is copied to a temporary location on said computing device and executed therefrom, and wherein execution of said software is terminated and deleted from said temporary location upon disconnection of the plug-and-play cable from the computing device.

27. The interactive system of claim 25, wherein said software registers a request with the operating system of said computing device to delete said software at a later time.

28. The interactive input system of claim 22, further comprising pen tray settings stored on said storage.

29. A method of mapping a display of a computing device to an interactive screen comprising:
connecting a plug-and-play cable comprising storage between the computing device and a controller associated with the interactive screen;
establishing a bi-directional communication channel between the computing device and the controller over the plug-and-play cable;
in response to a request received by the controller from the computing device, sending a plurality of human interface device profiles from the controller to the computing device;
loading a first of the received human interface device profiles on said computing device;
executing by the computing device software stored on the storage of said plug-and-play cable causing said computing device to instruct said controller to switch from the first human interface device profile to a second human interface device profile;
retrieving calibration settings upon connection of the plug-and-play cable, said calibration settings being associated with functionality provided by the interactive screen; and automatically mapping the display of the computing device to the interactive screen using said calibration settings.

30. The method of claim 29 further comprising terminating execution of said software upon disconnection of said plug-and-play cable from said computing device, said computing device not persistently storing said software and settings thereafter.

31. The method of claim 29, wherein said executing comprises copying said software to storage on said computing device.

32. The method of claim 29, further comprising registering a request with the operating system of said computing device to delete said software at a later time.

33. The method of claim 29, further comprising retrieving pen tray settings upon connection of said plug-and-play cable.

34. A plug-and-play cable for connection between a computing device and a controller associated with an interactive system comprising:
storage;
software stored on said storage, said software being copied to said computing device and executed therefrom automatically when said plug-and-play cable is connected to said computing device to enable the computing device and controller to communicate; and
a two-way communication channel through said plug-and-play cable over which the computing device and interactive system communicate, settings for the interactive system being copied to said computing device over said communication channel, said settings being configured for use by said computing device to calibrate automatically a display of said computing device and a display of said interactive system upon connection of the plug-and-play cable between the computing device and the interactive system, wherein the software, when executed, causes said computing device to instruct said controller to switch from a first human interface device profile to a second human interface device profile.

35. The plug-and-play cable of claim 34, wherein said settings on said storage further comprise pen tray settings.

36. An interactive input system comprising:
an interactive surface having a controller; and
a plug-and-play cable connecting a computing device to the controller and establishing a bi-directional communication channel therebetween, said plug-and-play cable comprising:
storage;
executable software stored on said storage, said software being automatically executed by the computing device when said plug-and-play cable is connected to the computing device; and
settings stored on said storage, said settings being transferred to the computing device via said plug-and-play cable, said settings comprising calibration settings used by the computing device to calibrate automatically the computing device and the interactive surface and pen tray settings, wherein said software enables said computing device and controller to communicate over said bi-directional communication channel and is operable to detect disconnection of said plug-and-play cable from said computing device and terminate execution in response thereto, said computing device not persistently storing said software and settings thereafter.

37. The interactive system of claim 36, wherein said plug-and-play cable comprises a universal serial bus interface.

38. The interactive system of claim 37, wherein said storage stores an autorun file that specifies said software for automatic execution.

39. The interactive system of claim 36, wherein said plug-and-play cable comprises a compact disk human interface device (CD HID) profile.

40. The interactive system of claim 36, wherein said software is copied to a temporary location on said computing device and executed therefrom, and wherein execution of said software is terminated and deleted from said temporary location upon disconnection of the plug-and-play cable from the computing device.

41. The interactive system of claim 36, wherein said software registers a request with the operating system of said computing device to delete said software at a later time.

42. The interactive input system of claim 36, wherein upon request of said computing device, said controller sends a plurality of human interface device profiles to said computing device via said plug-and-play cable, and upon receiving said plurality of human interface device profiles, said computing device loads a first human interface device profile.

43. The interactive input system of claim 42, wherein when said software is executed, said software instructs said computing device to send a command to said controller instructing said controller to switch from the first human interface device profile to a second human interface device profile.

44. A method of interacting with an interactive surface comprising:
connecting a plug-and-play cable between a computing device and a controller associated with said interactive surface;
establishing a bi-directional communication channel between said computing device and said controller via the plug-and-play cable;
automatically locating executable software stored on memory of said plug-and-play cable specified for execution and executing said located software on said computing device to enable said computing device and controller to communicate over said bi-directional communication channel;
automatically locating calibration settings and pen tray settings for said interactive surface and transferring the settings to said computing device;
automatically calibrating said computing device and said interactive surface using said calibration settings; and
terminating execution of said software upon disconnection of said plug-and-play cable from said computing device, said computing device not persistently storing said software and settings thereafter.

45. The method of claim 44, wherein said executing comprises copying said software to storage on said computing device.

46. The method of claim 44 further comprising:
sending a plurality of human interface device profiles from said controller to said computing device; and
upon receiving said plurality of human device interface device profiles, loading a first human device interface device profile on said computing device.

47. The method of claim 46 wherein during execution of said software, said computing device instructs said controller to switch from the first human interface device profile to a second human interface device profile.

48. A plug-and-play cable for interconnecting a controller associated with an interactive surface and a computing device and establishing a bi-directional communication channel therebetween, said plug-and-play cable comprising:
storage; and
a hub communicating with said storage, said hub providing executable software stored in said storage to said computing device for automatic execution upon connection of said plug-and-play cable to said computing device to enable the computing device and controller to communicate over said bi-directional communication channel, said plug-and-play cable further communicating calibration settings and pen tray settings to the computing device when the plug-and-play cable interconnects the controller and computing device, wherein said calibration settings are configured for use by the computing device to calibrate automatically said computing device and said interactive surface.

49. The plug-and-play cable of claim 48, wherein said software references said calibration settings during execution.

50. The plug-and-play cable of claim 49, wherein said software-automatically detects disconnection of said plug-and-play cable from said computing device and terminates execution in response thereto, said computing device not persistently storing said software and settings thereafter.

51. The plug-and-play cable of claim 50, wherein the interactive surface comprises a touch panel on which images are projected, said calibration settings mapping touch panel and displayed image coordinate systems.

52. The plug-and-play cable of claim 51, wherein said software is copied to a temporary location on said computing device and executed therefrom, and wherein execution of said software is terminated and deleted from said temporary location upon disconnection of the plug-and-play cable from the computing device.

53. The plug-and-play cable of claim 48 wherein upon request of said computing device, said controller sends a plurality of human interface device profiles to said computing device, and upon receiving said plurality of human device profiles, said computing device loads a first human device profile.

54. The plug-and-play cable of claim 53 wherein when said software is executed, said computing device sends a command to said controller instructing said controller to switch from the first human interface device profile to a second human interface device profile.

55. An interactive system comprising:
a controller;
a plug-and-play cable comprising storage, said plug-and-play cable connecting the controller to a computing device and establishing a bi-directional communication channel therebetween;
an interactive display on which a computer-generated image from said computing device is displayed; and
calibration settings and pen tray settings stored on said storage, said calibration settings and pen tray settings being transferred to said computing device upon execution of software stored in said storage, said calibration settings being used by said computing device to automatically map a display of said computing device to said interactive display upon connection of said plug-and-play cable to the controller and computing device.

56. The interactive system of claim 55, wherein said computer-generated image comprises a graphical user interface.

57. The interactive system of claim 55, wherein said plug-and-play cable comprises a universal serial bus interface.

58. The interactive system of claim 55, further comprising calibration software stored on said storage for execution by the computing device to set said calibration settings.

59. The interactive system of claim 58, wherein said software is copied to a temporary location on said computing device and executed therefrom, and wherein execution of said software is terminated and deleted from said temporary location upon disconnection of the plug-and-play cable from the computing device.

60. The interactive system of claim 55 wherein upon request of said computing device, said controller sends a plurality of human interface device profiles to said computing device, and upon receiving said plurality of human interface device profiles, said computing device loads a first human interface device profile.

61. The interactive system of claim 60 wherein upon execution of said software, instructions are transferred to said computing device to send a command to said controller to switch from the first human interface device profile to a second human interface device profile.

62. A method of mapping a display of a computing device to an interactive screen comprising:
connecting a plug-and-play cable comprising storage between the computing device and a controller associated with the interactive screen;
establishing a bi-directional communication channel between the computing device and the controller over the plug-and-play cable;
executing by the computing device software stored on the storage of said plug-and-play cable to enable the computing device and interactive screen to communicate over the bi-directional communication channel;
retrieving calibration settings and pen tray settings upon connection of the plug-and-play cable, said calibration settings being associated with functionality provided by the interactive screen; and
automatically mapping the display of the computing device to the interactive screen using said calibration settings.

63. The method of claim 62 further comprising terminating execution of said software upon disconnection of said plug-and-play cable from said computing device, said computing device not persistently storing said software and settings thereafter.

64. The method of claim 62 further comprising:
sending a plurality of human interface device profiles from said controller to said computing device; and
upon receiving said plurality of human device interface device profiles, loading a first human device interface device profile on said computing device.

65. The method of claim 64 wherein execution of said software by the computing device causes said computing device to instruct said controller to switch from the first human interface device profile to a second human interface device profile.

66. A plug-and-play cable for connection between a computing device and a controller associated with an interactive system comprising:
storage;
software stored on said storage, said software being copied to said computing device and executed therefrom automatically when said plug-and-play cable is connected to said computing device to enable the computing device and controller to communicate; and
a two-way communication channel through said plug-and-play cable over which the computing device and interactive system communicate, calibration settings and pen tray settings for the interactive system being copied to said computing device over said communication channel, said calibration settings being configured for use by said computing device to calibrate automatically a display of said computing device and a display of said interactive system upon connection of the plug-and-play cable between the computing device and the interactive system.

67. The plug-and-play cable of claim 66 wherein upon request of said computing device, said controller sends a plurality of human interface device profiles to said computing device, and upon receiving said plurality of human device profiles, said computing device loads a first human interface device profile, and when executed, said software instructs said computing device to send a command to said controller instructing said controller to switch from the first human interface device profile to a second human interface device profile.

* * * * *